US008669470B2

(12) United States Patent
Okino et al.

(10) Patent No.: US 8,669,470 B2
(45) Date of Patent: Mar. 11, 2014

(54) ELECTRIC CABLE SHIELD STRUCTURE

(76) Inventors: Kentaro Okino, Yamato (JP); Shigeru Shindoh, Tokyo (JP)

( * ) Notice: Subject to any disclaimer, the term of this patent is extended or adjusted under 35 U.S.C. 154(b) by 245 days.

(21) Appl. No.: 13/144,564

(22) PCT Filed: Jan. 26, 2010

(86) PCT No.: PCT/JP2010/000422
§ 371 (c)(1),
(2), (4) Date: Aug. 18, 2011

(87) PCT Pub. No.: WO2010/089968
PCT Pub. Date: Aug. 12, 2010

(65) Prior Publication Data

US 2011/0290556 A1 Dec. 1, 2011

(30) Foreign Application Priority Data

Feb. 3, 2009 (JP) ................................ 2009-022091

(51) Int. Cl.
*H02G 15/02* (2006.01)

(52) U.S. Cl.
USPC .......................... 174/36; 174/102 R; 174/108

(58) Field of Classification Search
USPC ....................................... 174/36, 102 R, 108
See application file for complete search history.

(56) References Cited

U.S. PATENT DOCUMENTS 5,349,133 A 9/1994 Rogers
7,601,915 B2 * 10/2009 Lumachi et al. .............. 174/107
2006/0048966 A1 * 3/2006 Takahashi et al. ............ 174/108

FOREIGN PATENT DOCUMENTS

EP 0344838 A2 6/1989
EP 0344838 A2 * 6/1989
JP 2004-063418 2/2004
WO 00/79545 A1 12/2000

* cited by examiner

*Primary Examiner* — Hoa C Nguyen
*Assistant Examiner* — Amol Patel
(74) *Attorney, Agent, or Firm* — Greenblum & Bernstein, P.L.C.

(57) ABSTRACT

A metal sheet tape including magnesium as a major component thereof having high electro-magnetic shield performance, high vibration absorption performance as well as high heat conductivity being wound spirally on an outer circumference of the electric cable may provide a high performance shield layer. Furthermore in an AV cable, original sounds may be recovered by forming a shield layer with winding spirally the metal sheet tape, which includes magnesium as a major component and is wound in the counter clockwise direction in the direction viewed from an IN end to an OUT end of an AV cable.

14 Claims, 7 Drawing Sheets

ELECTRIC CABLE SHIELD STRUCTURE

TECHNICAL FIELD

The present invention relates to a shield structure for an electric cable and more particularly, the present invention relates to a shield structure including magnesium as the major component thereof used for an electric cable.

BACKGROUND ART

Generally, various electric cables for signal communication and power supply etc. to an electronic apparatus are used in the condition where the electric cables are exposed to steady noises such as electro-magnetic wave and/or vibrations. When the electric cable receives such external noises, the signals under communication may be disturbed and erroneous actions may take place in a precise electronic apparatus such as a computer in the worst case.

In order to suppress the influence of the external noises as describe above, it has been so far proposed to shield the electric cable. In this regard, Japanese Patent (Laid-Open) No. 2004-63418 (Patent Literature 1) discloses a parallel dual line shielded cable to which a shield layer is formed by winding spirally thereon a metal sheet tape such as an Al-PET tape or a copper-deposited PET tape. Such metal sheets could provide certain shield effects for the electro-magnetic wave; however, it has been insufficient with respect to a vibration absorption effect. An improved shield performance has still been expected as a performance of electronic apparatuses, a speed of the signal communication, and a high density implementation of wirings in the apparatus and the like are improved.

In addition, for the electric cable such as an AV (Audio Visual) cable, which is required to transmit delicate analog signals as faithfully as possible, influence of the external noises is clearly reflected to qualities of outputs (sound quality and/or image quality), and then the external noises must be reduced to the limit as low as possible. Moreover, when the shield layer of the audio cable is constructed by using a copper sheet or an aluminum sheet, the technical problem that incongruity on timbre of the output sounds (i.e., so called overlap of metallic sounds) has been caused because resonance components being unique to the above metal materials are migrated to the sound signals.

SUMMARY OF INVENTION

Technical Problem

The present invention has been completed by considering the above problem of the conventional art and an object of the present invention is to provide a novel shield structure for an electric cable which is able to cut-off the influence of the external noises as low as the limit thereof.

Solution to Problem

The inventors have obtained an idea from the material property of magnesium having high electro-magnetic shield performance, high vibration absorption performance as well as high heat conductivity and the inventors have reached the construction to complete the present invention in which a shield layer is formed on an outer circumference of an electric cable by winding spirally a metal sheet tape, which includes magnesium as a major component.

Also the inventors have found the fact to complete the invention that original sounds may be play-backed with extremely high faithfulness by forming a shield layer with winding spirally the metal sheet tape including magnesium as the major component in the counter clock wise (CCW) direction when viewed from an IN end to an OUT end of an AV cable.

Advantageous Effect of Invention

As described above, according to the present invention, the electric cable structure which is able to cut-off the effect of the external noises as low as the limit thereof may be provided.

DESCRIPTION OF EMBODIMENTS

Figure 1:
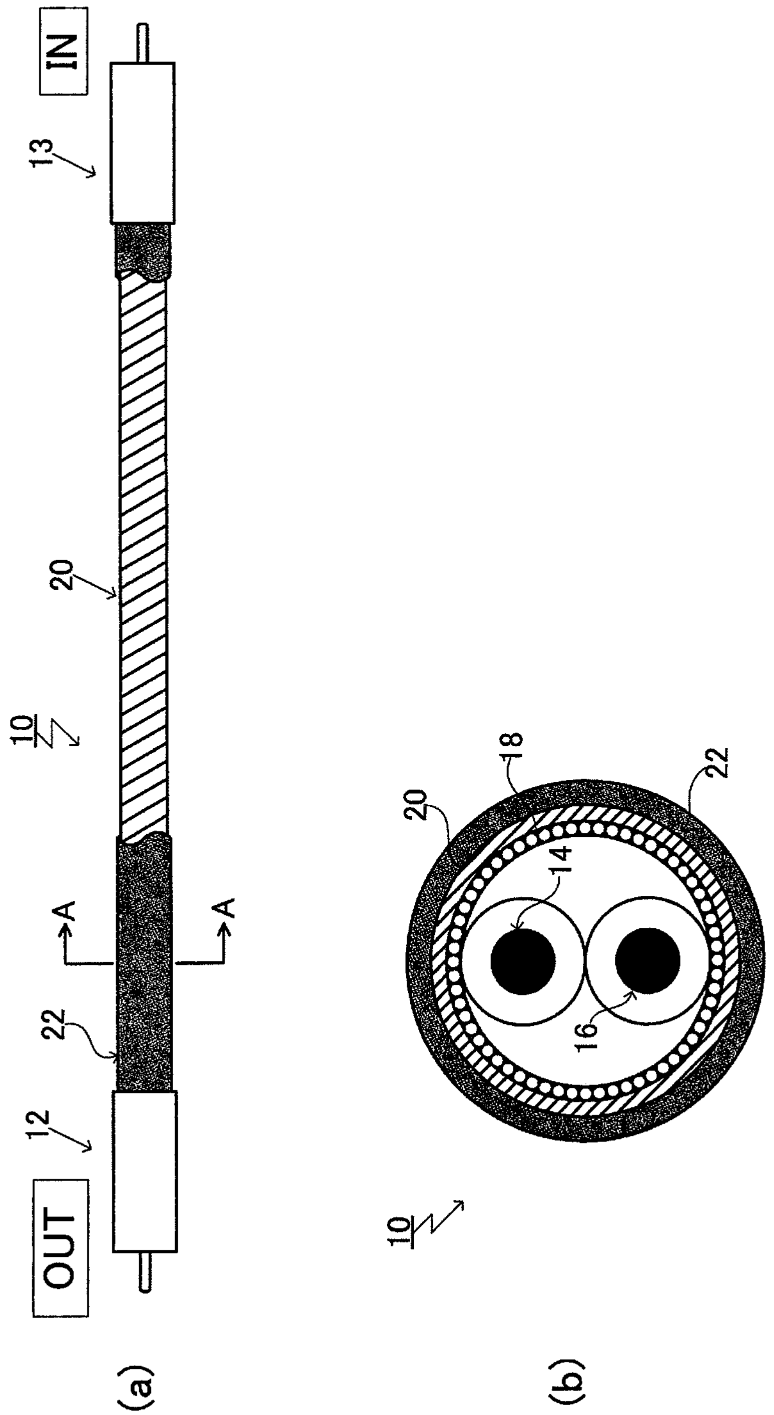
FIG. 1 shows a magnesium shield cable of the present embodiment.

Hereinafter, the shield structure for the electric cable of the present invention including magnesium as the major component (hereinafter simply referred to magnesium shield structure) will be explained using embodiments depicted in drawings; however, the present invention must not limited to the embodiments depicted in the drawings.

FIG. 1 shows the magnesium shield cable 10 (hereafter simply referred to the shield cable 10) as one embodiment of the present invention. The shield cable 10 depicted in FIG. 1 is exemplified as an RCA cable which comprises the pin plug 12 (OUT end) and the pin plug 13 (IN end) at the both ends, respectively. FIG. 1(*a*) depicts the side view of the shield cable 10 and FIG. 1 (*b*) depicts the cross section of the shield cable shown in FIG. 1(*a*) along with the A-A line.

As shown in FIG. 1 (*b*), the shield cable 10 is formed as a dual line cable which includes covered two signal lines, i.e., electric cables; the signal line 14 is connected to the hot terminal (+) and the line 16 is connected to the cold terminal (−). The signal line 14 and the signal line 16 are covered by a wire blaid 18 which is a known shield structure.

In the shield cable 10 of the present invention, the outer circumference of the copper wire blaid 18 is further covered by the magnesium shield layer 20 and the outermost circumference is covered by the sheath 22 made from synthesized polymer.

In FIG. 1 (*a*), a part of the sheath 22 are cut away to expose the magnesium shield layer 20 placed inside of the cable for simplify the explanation. As shown in FIG. 1 (*a*), the magnesium shield layer 20 of the present embodiment are formed by winding spirally the tape-shaped metal sheet along with the longitudinal direction of the shield cable 10. The tape-shaped metal sheet of the present embodiment includes magnesium as the major component thereof. Practically-used metal magnesium has more excellent properties on the electro-magnetic wave shield and the vibration absorption than those of copper (Cu) and aluminum (Al) which have been used as shield materials for the conventional shield layer. In addition, the low density of magnesium also provides an additional advantage of reducing an weight of a product.

In the present embodiment, a magnesium alloy sheet may be used as a tape-shaped strip and it is most preferred to use a pure-magnesium sheet as the shield layer. When the magnesium alloy sheet is used, higher contents of the magnesium in the alloy is preferred; the content percentage of magnesium not less than 95% may be preferred; the content percentage of magnesium not less than 96% may be more preferred; the content percentage of magnesium not less than 97% may be most preferred.

Figure 2:
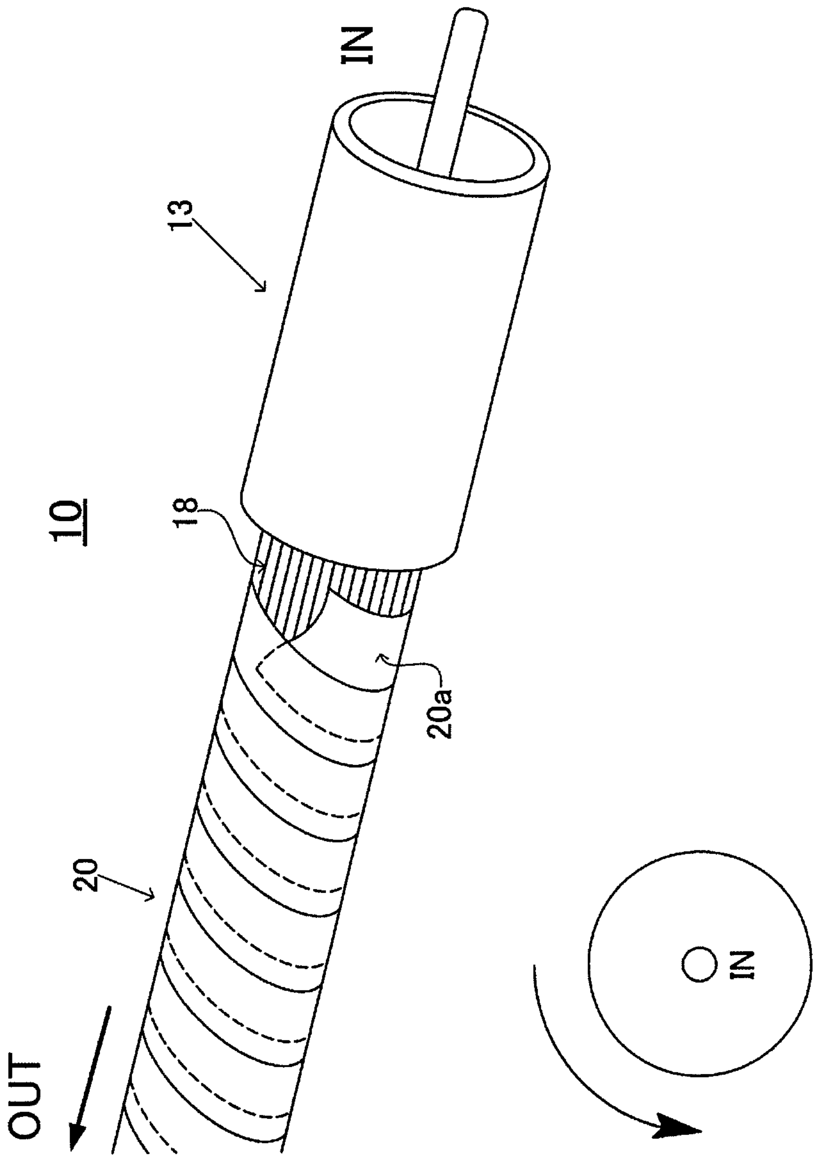
FIG. 2 shows an enlarged perspective view around an IN end of a magnesium shield cable of the present embodiment.

Next, the method for forming the magnesium shield structure of the present invention will be explained based on the structure of the shield cable 10. FIG. 2 shows the enlarged view around the IN end of the shield cable 10 of the present embodiment. In FIG. 2, the embodiment of the shield cable 10 in which the sheath 22 is removed for simplifying the explanation is depicted. As shown in FIG. 2, the magnesium shield layer 20 of the magnesium shield structure is formed by winding spirally the tape-shaped metal sheet 20*a* on the outer circumference of the copper blaid 18 at the radially outer position of the signal lines 14, 16. In the preferred embodiment, it is preferred that the winding of the metal sheet tape is conducted using one continuous metal sheet tape 20*a* extending from the start point at the IN end to the end point at the OUT end.

In addition, when the metal sheet tape 20*a* is wound on the outer circumference of the sheath 18, it is preferred to wind the tape spirally such that about one half of a tape width of the metal sheet tape 20*a* is mutually and evenly overlapped so as not remain of spacing between lateral edges of the tape. By winding spirally the metal sheet tape 20*a* under such winding process, the formation of the spacing together with the break-off of the metal sheet due to the stress of tape 20*a* may be prevented even when the shielded cable 10 is bent under a particular usage.

Heretofore, the formation method of the magnesium shield layer 20 has been described based on the shield cable 10 of the present embodiment. Now, the electric connection condition of the magnesium shield layer 20 in the shield cable 10 of the present embodiment will be explained with referencing FIG. 3.

Figure 3:
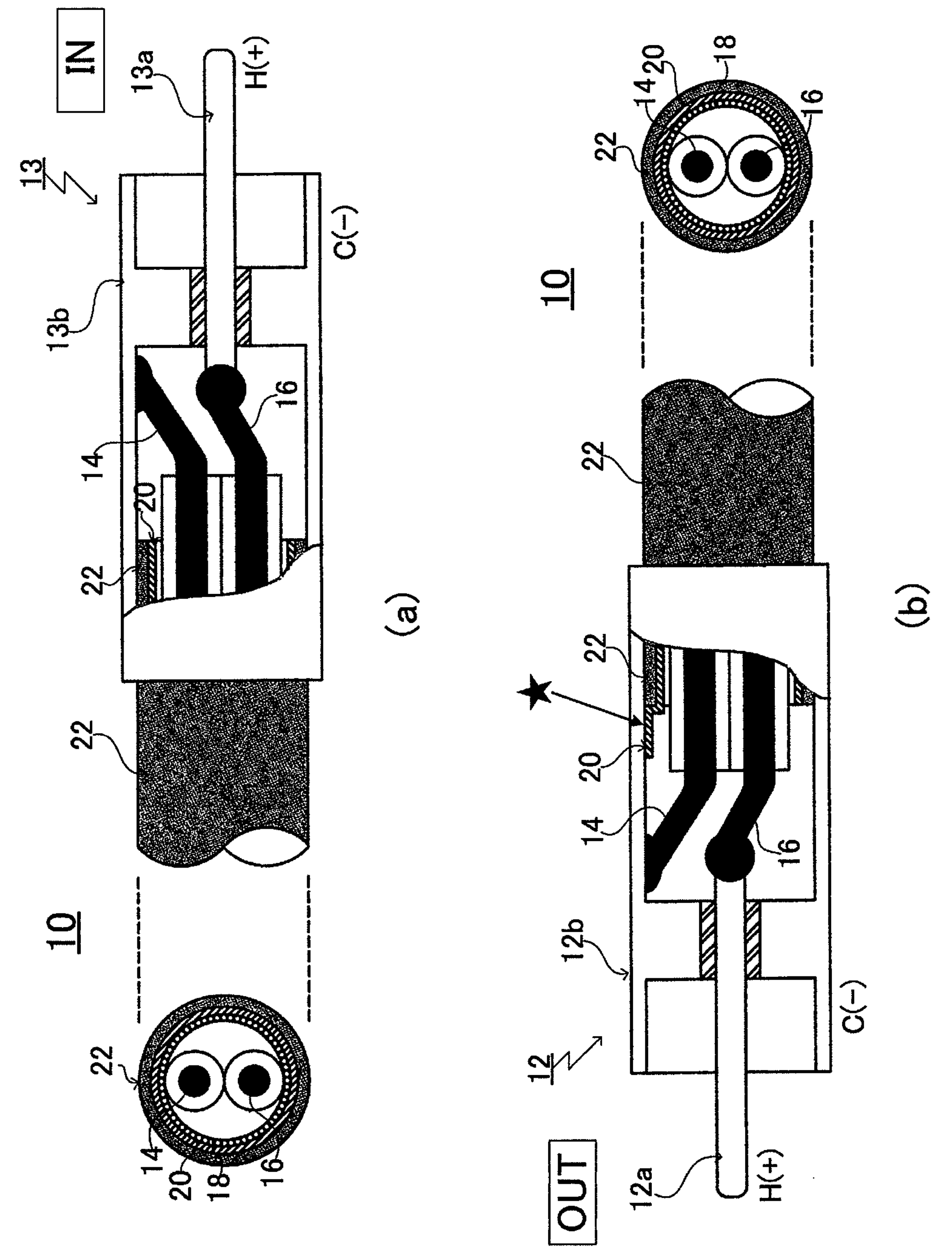
FIG. 3 shows an inside cross section of a magnesium shield cable of the present embodiment.

FIG. 3 depict the inside cross section of the pin plugs of the shield cable 10; FIG. 3 (*a*) shows the inside cross section of the pin plug 13 disposed at the IN end and FIG. 3 (*b*) shows the inside cross section of the pin plug 12 disposed at the OUT end. As depicted in FIG. 3 (*a*), in the pin plug 13 at the IN end the signal line 16 is electrically connected to the pin 13*a* by a solder material etc. and the signal line 14 is connected electrically to the body 13*b* also by the solder material etc. Here, the sheath 20 is inserted between the magnesium shield layer 20 and the body 13*b* such that the magnesium shield layer 20 and the body 13*b* are insulated electrically.

In turn, as shown in FIG. 3 (*b*), in the pin plug 12 at the OUT end, the signal lines 16, 14 are respectively connected to the pin 12*a* and the body 12*b* by the solder material as described above as to the IN end construction; however, there are difference from the IN end in the pin plug 12 at the OUT end as indicated by the arrow in the figure; the magnesium shield layer 20 and the body 12*b* are connected electrically each other by soldering, pressing or other appropriate methods.

Heretofore, the electric connection condition of the magnesium shield layer 20 in the present embodiment has been described and now the work and the advantage of the magnesium shield structure of the present invention will be explained based on the shield cable 10 as well.

Figure 4:
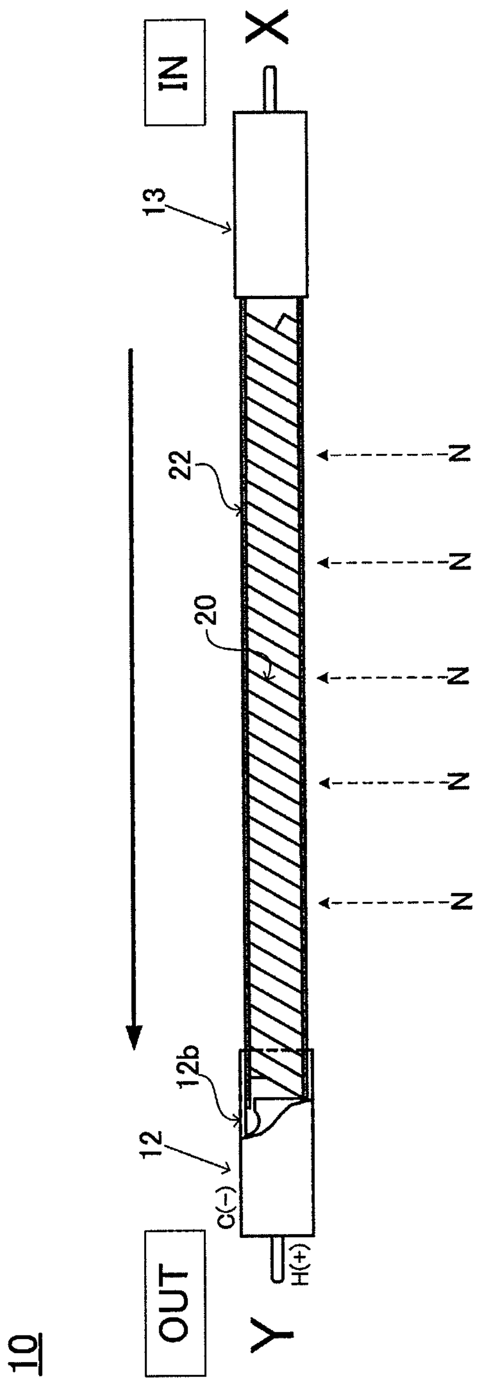
FIG. 4 shows a scheme for explaining the work and the effect of a magnesium shield cable of the present embodiment.

FIG. 4 shows a scheme for explaining the work and the technical advantage of the magnesium shield cable 10 of the present embodiment. Here, the explanation will be described in the assumption that the pin plug 13 of the shield cable 10 is connected to a CD player apparatus X (not shown) and the pin plug 12 is connected to an amplifier Y (not shown). When a given sound source CD is play-backed in the CD player apparatus, the sound signal outputted from the CD player apparatus may carried to the direction of the arrow (the right to the left in the plane of the drawing) through the signal line inside the shield cable 10.

On the other hand, the shield cable 10 is exposed to the external noises, i.e. the electro-magnetic wave and/or the vibration from the outside of the shielded cable 10 during the propagation. The external noise (N) may reach to the magnesium shield layer 20 with passing through the sheath 22. Here, the magnesium shield layer 20 of the present invention is crafted by the metal sheet including magnesium as the major component and magnesium has extremely high electro-magnetic wave shield performance and furthermore the vibration absorption ratio thereof is the highest one among the practically used metals such that the electro-magnetic wave invaded to the shield cable 10 from the outside is shielded properly by the magnesium shield layer 20 and the vibration carried from the outside is also absorbed properly by the magnesium shield layer 20.

In the shield cable 10 according to the present embodiment, when the magnesium shield layer 20 is crafted using one continuous metal sheet tape 20*a* while insulating the IN end thereof from the pin plug 13 and connecting electrically the OUT end thereof to the body 12*b* of the pin plug 12, i.e. the cold terminal (−) as described above, the direction of propagating the noises is aligned from the IN end to the OUT end. Then, the noises picked-up from the outside by the magnesium shield layer 20 may be directed to the ground (earth) of the amplifier connected at the OUT end through the body 12*b* of the pin plug 12, i.e. the cold terminal (−) without any feedback the picked-up noise from the outside to the CD player apparatus placed at the IN end. As explained above, the magnesium shield structure of the present invention adopts magnesium as the element material which has excellent properties both of the electro-magnetic wave shield and the vibration absorption so that the present invention may reduce the interference of the external noises to the propagating signals almost in the maximum level.

While the present magnesium shield structure has been described by using practical embodiments depicted in FIGS. 1-4, the magnesium shield structure must not limited to the described embodiments. In summary, the shield cable structure which comprises the metal sheet tape including magnesium as the major component thereof that is wound spirally about the electric cable so as to cover the outer circumference the electric cable should be included within the scope of the present invention. Here, the embodiments for winding the metal sheet tape on the outer circumference of the electric cable may include (1) the embodiment in which the metal sheet tape is wound directly on the outer surface of the cover film of the electric line, (2) the embodiment in which the metal sheet tape is wound on the outer circumference of the bundle of a plurality of electric lines, (3) the embodiment in which the metal sheet tape is wound on the outer circumference surface of a sheath of an already-exist electric cable, (4)

and/or the embodiment in which the metal sheet tape is wound on the outer circumference of the bundle of a plurality of already-exist electric cables.

In the above described descriptions, the present invention has been explained using the RCA cable for simplifying the description. The application range of the present magnesium shield structure should not limited to electric cables and/or lines for particular applications and/or specifications and hence, the present magnesium shield structure may be applied to various cables and/or lines being potentially connected between any electronic apparatus as well as connection cables for apparatuses relating to a computer and/or for an AV relating apparatus.

Such connection cables relating to a computer may include a single electric line, paired lines, IDE cables, ultra ATA cables, serial ATA cables, HDMI cables, LAN cables, monitor cables, USB cables, IEEE cables, SCSI cables, printer cables, or main power supply cables for computer related apparatuses. More particularly, it is expected beneficial to apply the present magnesium shield structure to SCSI, ultra ATA cables, and/or serial ATA cables for high rate data transmission.

In addition, such connection cables for an AV related apparatus may include general purpose AV cable (audio cables and/or video cables), cables for electric instruments such as, for example, speaker cables, microphone cables, D terminal cables, HDMI cables, guitar cables, etc., and/or main power supply cables for AV related apparatuses. In other applications, the present magnesium shield structure may be applied to connection cables for various electronic apparatuses, main power supply cables, antennae, telephone cables, and the like.

Furthermore, the present magnesium shield structure may be applied to inner wirings of the electronic apparatuses as well as external connection cables between the electronic apparatuses. For instance, about inner wirings of a personal computer, such inner wirings may include power supply cables for a cooling device such as a CPU fan or a casing fan, a hard disk drive or a DVD drive and/or various data cables etc. While the applicable range of the present magnesium shield structure has been exemplified, the present magnesium shield structure may provide particularly significant advantages when applied to electric cables being required to communicate delicate analog signals faithfully. Among such applications, when the present magnesium shield structure is applied to AV apparatus connections, the following advantages may be expected:

When copper (Cu) or aluminum (Al) etc, and other metals are used as the shield materials for AV cables as conventional arts, it may be possible to cancel the external noises depending on material properties thereof. However, the conventional shield metals themselves are not entirely neutral to the acoustic signals and hence, the vibrations unique to the metals inevitably interfere the acoustic signals. Such interference by the metal material for the shield layer results in mixing of complex resonant vibration on the acoustic signals and then, the mixed noises being not recorded in the sound source may transferred to the amplifier so that incongruity about the sense of hearing may be generated on the final outputs (sound timbre).

In relation to the above defect, the present magnesium shield structure includes magnesium as the major component thereof and the unique vibration of magnesium may interfere to the acoustic signals as well. Now it is known that the influence of the complex resonance vibration on the acoustic signals is quite similar to the influence of complex resonance to the acoustic signals by wood. Then, the incongruity in the sense of hearing may be suppressed on the final outputs (sound timbre) as low as possible. That is to say, because the acoustic components of the recorded original sounds in a music CD generally include the complex resonance component originated from the wood beforehand; instruments and/or a recording studio may include wood materials to some extent. It is supposed that such magnesium having the sound timbre similar to that of wood shows good matching to the sound signals. As the results, the magnesium shield structure of the present invention could provide the significant advantages in that the sound signal can not be disordered but also the feel of the original sounds can not be changed.

With respect to the application for the AV cable, the direction of the magnesium metal tape winding is preferred as shown in FIG. 2 such that the spiral in a counter clock wise (turning to left) when viewed from the IN end to the OUT end. The reason of the above feature is not clear; however, the inventors have found the fact that outlines of the sounds becomes clearer in the embodiment having the counter clock wise wound spiral when compared to the outlines of the sounds in the clock wise wound spiral embodiment. In addition, the inventors have found the fact that the sense of hearing is significantly improved when the magnesium content percentages in the magnesium metal tape not less than 97% is used.

Heretofore, the present invention has been described using the particular embodiment; however, the present invention must not be limited to the above described embodiments and other embodiments thought by a person skilled in the art and providing the work and advantage of the present invention are included in the scope of the present invention.

EXAMPLE

Hereafter, the present invention will be detailed more concretely using practical examples; however, the present invention must not be limited to the examples described hereafter.

Example 1

Examination of Shield Effect of Magnesium Shield

To evaluate the shield effect of the magnesium shield of the present invention, several experiments were conducted. The evaluation examinations described hereunder were conducted by using Absorption Clamp Test specified in IEC SPECIFICATION (IEC1196-1, IEC61196-1).

Commercially available LAN cable (category 6, total length 7 m, available from SANWA SUPPLY INC., Type Number KB-T7E-07) was used as the electric cable.

An aluminum alloy tape (width 20 mm, thickness 45 micro-meters, magnesium content percentage 95-96%, Aluminum 3%, Zinc 1%, Product Serial Number AZ31B, available from NIPPON KINZOKU CO., LTD.) was wound spirally to the above LAN cable such that the spiral was developed to be counter clock wise when viewed from the IN end. The tape winding was performed by evenly overlapping about one half of the tape width each other with starting from the IN end and finishing the OUT end direction so as not to remain openings between lateral edges of the tape. As comparative samples, the LAN cables were wound with an aluminum sheet tape (Comparative sample 1) and a copper sheet tape (Comparative sample 2) instead of the magnesium sheet tape while keeping other processes for forming the objective sample to be same.

Figure 5:
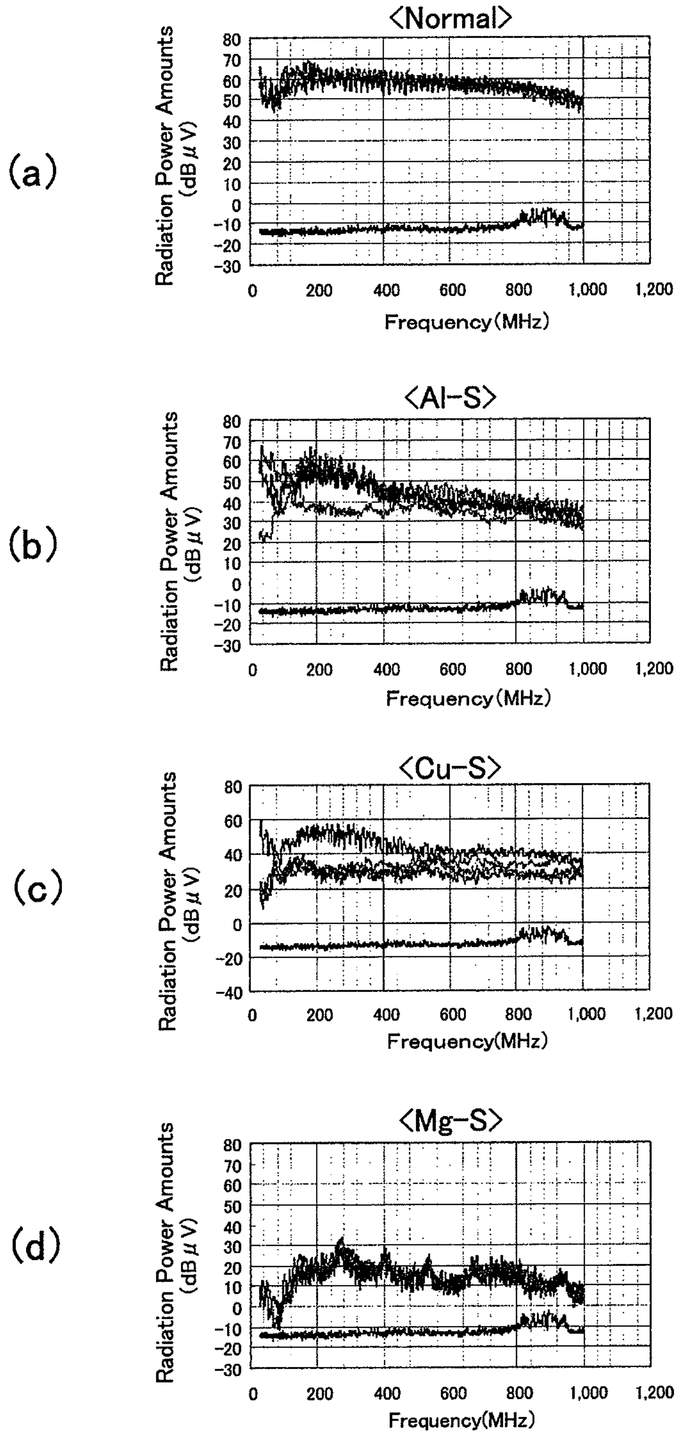
FIG. 5 shows results of evaluation experiments of a shield effect using an absorption clamp method.

FIG. 5(*a*)-(*c*) each shows the results for the LAN cable wound with the aluminum sheet (in FIG. 5, referred to "Al—S"; Comparative sample 1), the LAN cable wound with the copper sheet (in FIG. 5, referred to "Cu—S": Comparative sample 2), and the LAN cable wound with the magnesium alloy sheet tape (in FIG. 5, referred to "Mg—S": Objective example), respectively. In FIG. 5 (*d*), the results of the measurement for a raw LAN cable without the shield are shown as the reference data (in FIG. 5, referred to "Normal").

In each graph, the abscissa represents a radiation power amount (dB micro-V) and the ordinate represents a frequency (MHz). Also in the lower region of the graphs, a sensitivity level of the measurement system is shown as the reference data among the measurements. In the upper region of the graphs, four measured curves are provided and the curves indicate the results of the measurement for each of 4 cable pairs included in the used LAN cable (each of the cable pair has different impedance).

As shown in FIGS. 5 (*a*) and (*b*) that correspond to the results "Al—S" and "Cu—S", the radiation power amount were almost in the same level. On the other hand, as shown in FIG. 5 (*c*), the result "Mg—S" indicates the significantly low radiation power amount when compared to those of "Al—S" and "Cu—S". In FIG. 5 (*a*)-(*c*), tested results are shown in multiple curves corresponding to line pairs contained inside the LAN cable. This result suggests the present sample "Mg—S" has the low noise supply performance according to the scheme of Absorption Clamp Test; this suggests in turn high shield performance of the present "Mg—S" shield structure to the incoming noises from the outside to the inside of the shield cable. In addition, the sample "Mg—S" shows excellent evenness of the shield performances for line pairs inside the LAN cable when compared to the comparative samples "Al—S" and "Cu—S".

From the results described above, it was observed that the magnesium shield of the present invention has a significantly higher shield effect than the conventional shields.

Example 2

Examination of Effect on Sounds by Magnesium Shield

A sense of hearing test was conducted by connecting audio apparatuses with the cables implemented with the magnesium shield structure of the present invention.

Preparation of Magnesium Shield Cable

Figure 6:
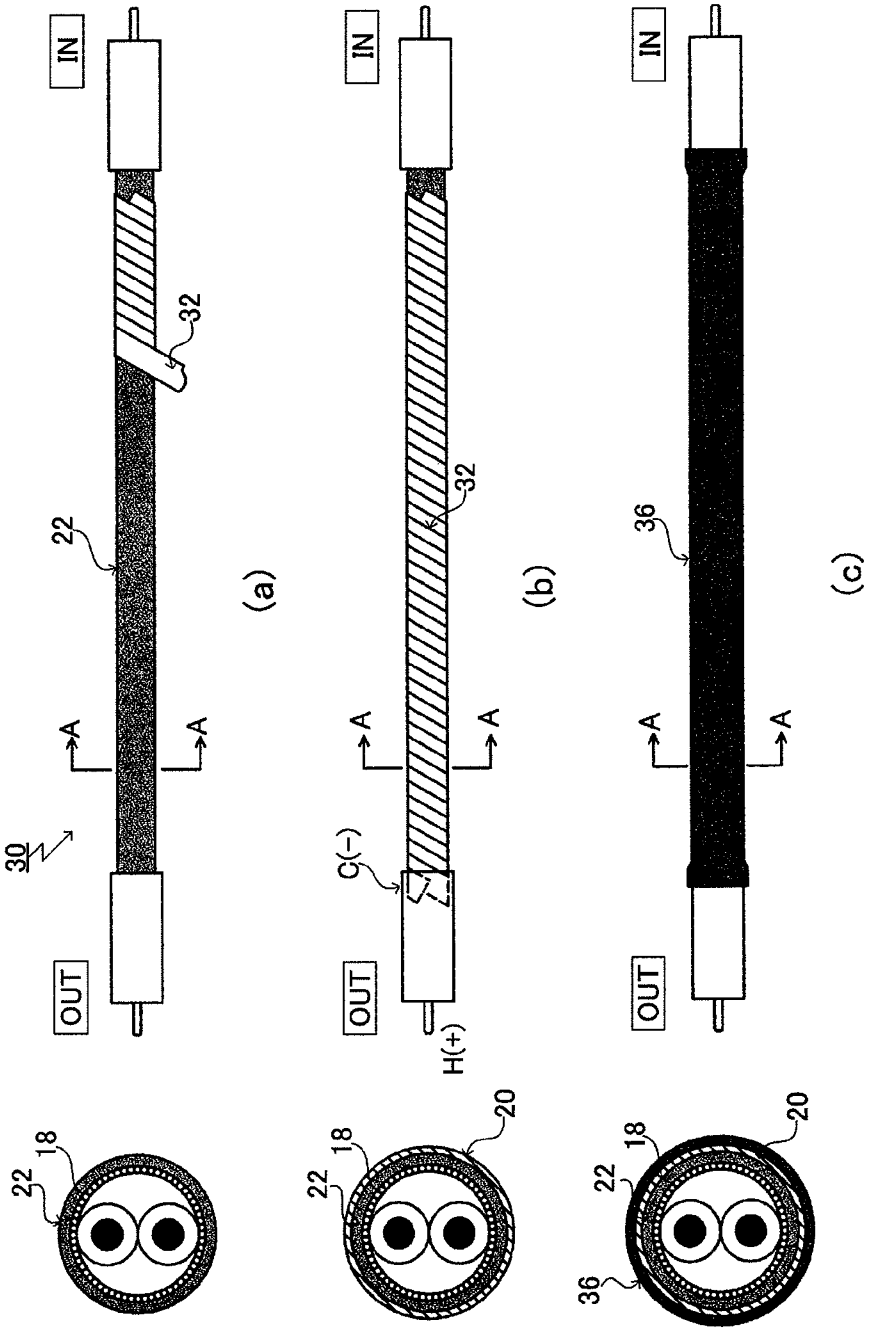
FIG. 6 shows time-sequentially a production process of a magnesium shield cable of the present embodiment.

The magnesium shield cable of the present embodiment was prepared by using a conventional audio cable. FIGS. 6(*a*)-(*c*) shows a preparation steps of the magnesium shield cable as the time sequence of the production process and in each of the figures, the side view and the cross sectional view (along with A-A line) of each processes are depicted. Hereafter, the formation of the magnesium shield cable will be described with referencing FIG. 6.

As shown in FIG. 6(*a*), first of all, the audio cable commercially available was selected. The audio cable 30 was a popular and commercially available RCA cable (Product Number K-1, available from KRYNA PRO CO., Total length 1000 mm) which was shielded by the copper blaid 18 and covered by the sheath 22. In first process of the production, the magnesium alloy sheet tape 32 (Width 20 mm, Thickness 55 micrometers, magnesium content percentage 95-96%, aluminum 3%, Zinc 1%, Product Number AZ31B, NIPPON KINZOKU CO., LTD.) was wound on the sheath 22 of the audio cable 30 from the IN end as the start point to the OUT end and the tape was evenly overlapped about one half of the tape width in the CCW direction viewed from the IN end. Here, using the similar process, another magnesium shield was prepared without winding the magnesium alloy sheet tape 32 in the CW direction viewed from the IN end.

Figure 7:
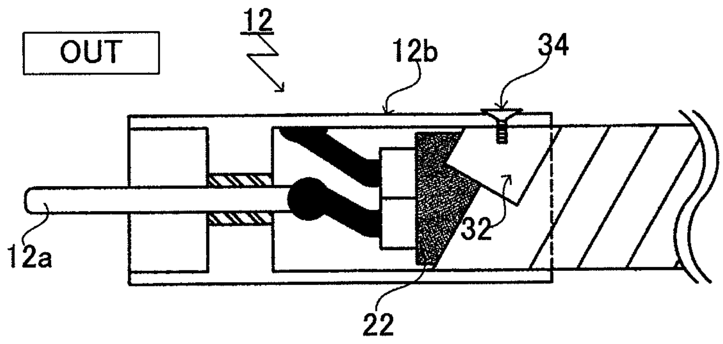
FIG. 7 shows a method for electrically connecting a cold terminal of an pin plug with a magnesium alloy sheet tape in a magnesium shield cable of the present embodiment.

FIG. 6(*b*) shows the process stage in which the magnesium alloy sheet tape 32 has completely wound to the Audio cable. As shown in FIG. 6(*b*), the start edge of the magnesium alloy sheet tape 32 was insulated from the pin plug 13 of the IN end to avoid the electric short circuit and the end edge thereof was electrically connected to the cold terminal (−) of the pin plug 12 at the OUT side. In the present example, as shown in FIG. 7, the electrical connection between the magnesium alloy sheet tape 32 and the cold terminal (−) was achieved by the metal bolt 34 passed through the body 12*b*, which was screwed into a screw hole opened to the body 12*b* at the pin plug 12 (OUT end). Because magnesium has a high melting point and it is suspected to burn when exposed to high temperature, the omission of the soldering process was preferred.

At last, as shown in FIG. 6(*c*), the heat shrinkable tube 36 (Product Number 9.5-12 mm, available from Sumitomo Electric Industries, Ltd., Total length 1000 mm) was applied to the outermost circumference of the shield structure in order to protect the magnesium alloy sheet tape 32 as the finished sample. The magnesium shield cable with the magnesium alloy sheet tape with the CW spiral was prepared in the similar process except for the winding direction. The magnesium shield cable with the CCW winding was marked to SAMPLE 1 and the magnesium shield cable with the CCW winding was marked to SAMPLE 2.

Example 3

Sense of Hearing Test

The above SAMPLE 1, SAMPLE 2, and the popular audio cable 30 (comparative example) were subjected to a sense of hearing test. Particularly, common CD sound sources were played in a same stereo apparatus comprising a CD player apparatus and an amplifier connected by the above described cable. The sound timbre was examined by trial hearing of a volunteer selected from audio apparatus development engineers.

As the trial hearing test, SAMPLE 1 obtained excellent evaluation results in all aspects of sound granularity, S/N ratio and topological feeling of instrument locations as well as results of improvement of the sound quality turning lighter when compared to the corresponding aspects of the comparative example. SAMPLE 2 (CCW) further obtained additional excellent results in faithful reproduction of sound in the aspects of highness and depth of the sounds when compared with SAMPLE 1 with maintaining the excellent aspects obtained for SAMPLE 1 (CW) so that the playing stage may be more easily imaged from the play-backed sounds.

By the test results, when the magnesium shield structure of the present invention is applied to the AV cable, it is confirmed that the influence of the external noises invading the cable may be reduced to the limit for realizing the faithful reproduction of the original sounds.

REFERENCE SIGNS LIST

10—magnesium shield cable, 12—pin plug, 13—pin plug, 14—signal line, 16—signal line, 18—copper blaid, 20—magnesium shield layer, 22—sheath, 30—conventional shield cable, 32—magnesium alloy tape, 34—metal bolt, 36—heat shrinkable tube

CITATION LIST

Patent Literature

PTL 1: Japanese Patent (Laid-Open) No. 2004-63418

The invention claimed is:

1. A shield structure for an electric cable, the shield structure comprising:

an electric cable transferring electric signals; and a tape-shaped metal sheet including a magnesium content percentage of not less than 95%, wherein the tape-shaped metal sheet is wound spirally on an outer circumference of the electric cable.

2. The shield structure of claim 1, wherein the magnesium metal sheet is made from pure magnesium.

3. A shield cable comprising the shield structure of claim 1.

4. A shield cable for connecting AV apparatuses, the shield cable comprising:

a shield layer; and an electric cable, the shield layer covering the electric cable and comprising a tape-shaped metal sheet having a magnesium content percentage of not less than 95% and being wound and extending spirally about the electric cable to form the shield layer from an IN end to an OUT end of the electric cable.

5. The shield cable of claim 4, wherein the magnesium metal sheet is made from pure magnesium.

6. The shield cable of claim 4, wherein the metal sheet is wound spirally in a counter clock wise direction when viewed from the IN end toward the OUT end.

7. The shield cable of claim 4, wherein the metal sheet is insulated from a terminal at the IN end and is electrically connected to a cold terminal at the OUT end.

8. The shield cable of claim 4, the shield layer is formed by one continuous metal sheet in a tape-shape.

9. A shield cable for connecting AV apparatuses comprising a shield layer and an electric cable, the shield layer covering the electric cable characterized in that the shield cable comprises:

an electric cable transferring electric signals therein; and a tape-shaped magnesium sheet being wound and extended spirally about the electric cable from an IN end to an OUT end of the cable, the magnesium sheet having a magnesium content percentage not less than 95% and being shaped to one continuous tape extending from the IN end to the OUT end, the magnesium metal sheet being insulated from a terminal at the IN end while being electrically connected to a cold terminal at the OUT end.

10. A shield cable for connecting AV apparatuses comprising a shield layer characterized in that the shield cable comprises:

an RCA cable for transferring analog signals; and a shield layer covering the RCA cable and comprising a tape-shaped magnesium sheet being wound and extended spirally about the cable from an IN end to an OUT end of the cable, the magnesium sheet having a magnesium content percentage not less than 95% and being shaped to one continuous tape extending from the IN end to the OUT end, the magnesium metal sheet being insulated from a pin plug at the IN end while being electrically connected to a cold terminal at the OUT end through a metal bolt being screwed and passing through a hole of a body of the pin plug at the OUT end.

11. The shield cable of claim 10, wherein an outer circumference of the shield layer is covered by a heat shrinkable tube.

12. A method for shielding an electric cable by shielding an electric cable by a shield layer, the method comprising:

forming the shield layer by a tape-shaped metal sheet including a magnesium content percentage of not less than 95%; and spirally winding the metal sheet about an outer circumference of the electric cable.

13. A shield cable comprising the shield structure of claim 1.

14. A shield cable comprising the shield structure of claim 2.

* * * * *